United States Patent
Christiansen

(10) Patent No.: US 7,768,543 B2
(45) Date of Patent: Aug. 3, 2010

(54) SYSTEM AND METHOD FOR DYNAMICALLY ALTERING VIDEOCONFERENCE BIT RATES AND LAYOUT BASED ON PARTICIPANT ACTIVITY

(75) Inventor: Bernd Oliver Christiansen, Santa Barbara, CA (US)

(73) Assignee: Citrix Online, LLC, Santa Barbara, CA (US)

( * ) Notice: Subject to any disclaimer, the term of this patent is extended or adjusted under 35 U.S.C. 154(b) by 1139 days.

(21) Appl. No.: 11/377,913

(22) Filed: Mar. 16, 2006

(65) Prior Publication Data

US 2007/0211141 A1    Sep. 13, 2007

Related U.S. Application Data

(60) Provisional application No. 60/781,070, filed on Mar. 9, 2006.

(51) Int. Cl.
H04N 7/15        (2006.01)
(52) U.S. Cl. .................................. 348/14.08
(58) Field of Classification Search .............. 348/14.08, 348/14.09, 14.01, 14.07
See application file for complete search history.

(56) References Cited

U.S. PATENT DOCUMENTS

| | | | |
|---|---|---|---|
| 4,650,929 A | 3/1987 | Boerger et al. | |
| 4,937,036 A | 6/1990 | Beard et al. | |
| 4,974,173 A | 11/1990 | Stefik et al. | |
| 5,062,060 A | 10/1991 | Kolnick et al. | |
| 5,241,625 A | 8/1993 | Epard et al. | |
| 5,255,361 A | 10/1993 | Callaway et al. | |
| 5,315,633 A | 5/1994 | Champa | |
| 5,382,972 A | 1/1995 | Kannes | |
| 5,440,719 A | 8/1995 | Hanes et al. | |

(Continued)

FOREIGN PATENT DOCUMENTS

GB         2313250         11/1997

(Continued)

OTHER PUBLICATIONS

Campbell et al., "Meeting End-To-End QoS Challenges for Scalable Flows in Heterogeneous Multimedia Environments," High Performance Networking VI, IFIP 6th International Conference on High Performance Networking (HPN), Palma De Mallorca, Sep. 13-15, 1995 No. CONF 6, Sep. 11, 1995, pp. 101-115.

(Continued)

Primary Examiner—Stella L Woo
(74) Attorney, Agent, or Firm—Goodwin Procter LLP

(57) ABSTRACT

Systems and Methods to transmit and simultaneously display all video streams in a video conference by dynamically adapting video streams based on audio volume of the participants include allocating an amount of bandwidth to a participant in a videoconference; determining a level of activity exhibited by the participant during the videoconference, and changing the amount of bandwidth allocated to the participant responsive to the determined level of activity. In another aspect, a method for displaying video streams includes creating a graphical representation of a participant in a videoconference; displaying the created graphical representation; determining a level of activity exhibited by the participant during the videoconference; and altering the displayed graphical representation of the participant responsive to the determined level of activity.

61 Claims, 8 Drawing Sheets

U.S. PATENT DOCUMENTS

| | | | |
|---|---|---|---|
| 5,446,491 | A | 8/1995 | Shibata et al. |
| 5,579,469 | A | 11/1996 | Pike |
| 5,684,527 | A * | 11/1997 | Terui et al. ............... 348/14.09 |
| 5,745,759 | A | 4/1998 | Hayden et al. |
| 5,758,110 | A | 5/1998 | Boss et al. |
| 5,838,906 | A | 11/1998 | Doyle et al. |
| 5,867,494 | A | 2/1999 | Krishnaswamy et al. |
| 5,964,839 | A | 10/1999 | Johnson et al. |
| 5,983,190 | A | 11/1999 | Trower, II et al. |
| 5,990,852 | A | 11/1999 | Szamrej |
| 5,999,525 | A | 12/1999 | Krishnaswamy et al. |
| 6,009,410 | A | 12/1999 | LeMole et al. |
| 6,052,120 | A | 4/2000 | Nahi et al. |
| 6,073,127 | A | 6/2000 | Lannert et al. |
| 6,138,155 | A | 10/2000 | Davis et al. |
| 6,155,840 | A | 12/2000 | Sallette |
| 6,166,729 | A | 12/2000 | Acosta et al. |
| 6,173,322 | B1 | 1/2001 | Hu |
| 6,199,753 | B1 | 3/2001 | Tracy et al. |
| 6,223,212 | B1 | 4/2001 | Batty et al. |
| 6,233,617 | B1 | 5/2001 | Rothwein et al. |
| 6,256,739 | B1 | 7/2001 | Skopp et al. |
| 6,275,942 | B1 | 8/2001 | Bernhard et al. |
| 6,295,551 | B1 | 9/2001 | Roberts et al. |
| 6,335,927 | B1 | 1/2002 | Elliott et al. |
| 6,366,933 | B1 | 4/2002 | Ball et al. |
| 6,397,036 | B1 | 5/2002 | Thean et al. |
| 6,400,996 | B1 | 6/2002 | Hoffberg et al. |
| 6,466,250 | B1 * | 10/2002 | Hein et al. ............... 348/14.08 |
| 6,473,114 | B1 * | 10/2002 | Strubbe ................... 348/14.08 |
| 6,539,429 | B2 | 3/2003 | Rakavy et al. |
| 6,553,377 | B1 | 4/2003 | Eschelbeck et al. |
| 6,584,493 | B1 | 6/2003 | Butler |
| 6,640,145 | B2 | 10/2003 | Hoffberg et al. |
| 6,643,696 | B2 | 11/2003 | Davis et al. |
| 6,646,673 | B2 * | 11/2003 | Caviedes et al. ......... 348/14.08 |
| 6,687,745 | B1 | 2/2004 | Franco et al. |
| 6,731,625 | B1 | 5/2004 | Eastep et al. |
| 6,754,181 | B1 | 6/2004 | Elliott et al. |
| 6,763,226 | B1 | 7/2004 | McZeal, Jr. |
| RE38,609 | E | 10/2004 | Chen et al. |
| 6,850,252 | B1 | 2/2005 | Hoffberg |
| 6,909,708 | B1 | 6/2005 | Krishnaswamy et al. |
| 7,006,881 | B1 | 2/2006 | Hoffberg et al. |
| 7,035,907 | B1 | 4/2006 | Decasper et al. |
| 7,145,898 | B1 | 12/2006 | Elliott |
| 2005/0080850 | A1 | 4/2005 | Salesky et al. |
| 2005/0099492 | A1 * | 5/2005 | Orr .......................... 348/14.08 |
| 2006/0120308 | A1 * | 6/2006 | Forbes et al. ................ 370/260 |

FOREIGN PATENT DOCUMENTS

| | | |
|---|---|---|
| GB | 2349055 | 10/2000 |
| WO | WO-99/20010 | 4/1999 |
| WO | WO-99/53691 | 10/1999 |
| WO | WO-2005/107220 | 11/2005 |

OTHER PUBLICATIONS

Freeman, H., "A Scheme For the Efficient Encoding of Graphical Data for Communication and Information Processing", Proceedings of the Electronics Congress-Advance in Electronics, Rassegna, IT, Mar. 24, 1969, pp. 340-348.

International Search Report for corresponding PCT Application No. PCT/US2007/05780, mailed Sep. 26, 2007, 4 pages.

Written Opinion for corresponding PCT Application No. PCT/US2007/05780, mailed Sep. 26, 2007, 7 pages.

Examiner's Report for Australian Patent Application No. 2007223936, mailed May 7, 2010, 2 pages.

* cited by examiner

SYSTEM AND METHOD FOR DYNAMICALLY ALTERING VIDEOCONFERENCE BIT RATES AND LAYOUT BASED ON PARTICIPANT ACTIVITY

RELATED APPLICATIONS

The present application claims the benefit of U.S. Provisional Patent Application Ser. No. 60/781,070, titled "METHOD TO TRANSMIT AND SIMULTANEOUSLY DISPLAY ALL VIDEO STREAMS IN A LARGE-SCALE VIDEO CONFERENCE BY DYNAMICALLY ADAPTING BIT RATES AND LAYOUT BASED ON VOLUME" and filed on Mar. 9, 2006.

FIELD OF THE INVENTION

The present invention relates to video conferences conducted across a network. More particularly, the present invention relates to systems and methods for simultaneously displaying video streams from multiple participants in a video conference and encoding and sending local video input.

BACKGROUND OF THE INVENTION

Many multi-way video conferencing applications display the video streams of the various participants in a window with a static layout, and may partition the available space on the screen fairly equally among participants. Many layouts are presently used for multi-way video conferencing applications to display the video streams of the various participants in a window. One layout is N-up, which partitions the window into N planar surfaces of equal size. Other video conferencing applications may arrange transformed surfaces in a window. For example, a chat application may feature a three-dimensional view that arranges participants as if they were sitting around a conference-room table.

In video conferences with many participants, it may become difficult to perceive a speaker as a display screen becomes crowded and views of individual persons become small. Also, many networks have bandwidth limitations which may be exceeded by transmitting a number of video streams above a certain size. Thus, there exists a need for video conference displays that effectively utilize bandwidth and display area to emphasize important information and views.

SUMMARY OF THE INVENTION

The present invention is directed to systems and methods to transmit and simultaneously display all video streams in a large-scale video conference by dynamically adapting video streams based on audio volume of the participants.

In one aspect, the present invention is a method of allocating bandwidth to participants in a videoconference. The method comprises: allocating an amount of bandwidth to a participant in a videoconference; determining a level of activity exhibited by the participant during the videoconference, and changing the amount of bandwidth allocated to the participant responsive to the determined level of activity.

In another aspect, the present invention is a method of generating a dynamic graphical representation of a participant in a videoconference that reflects the participant's level of activity during the videoconference. The method comprises: creating a graphical representation of a participant in a videoconference; displaying the created graphical representation; determining a level of activity exhibited by the participant during the videoconference; and altering the displayed graphical representation of the participant responsive to the determined level of activity.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE INVENTION

Figure 1A:
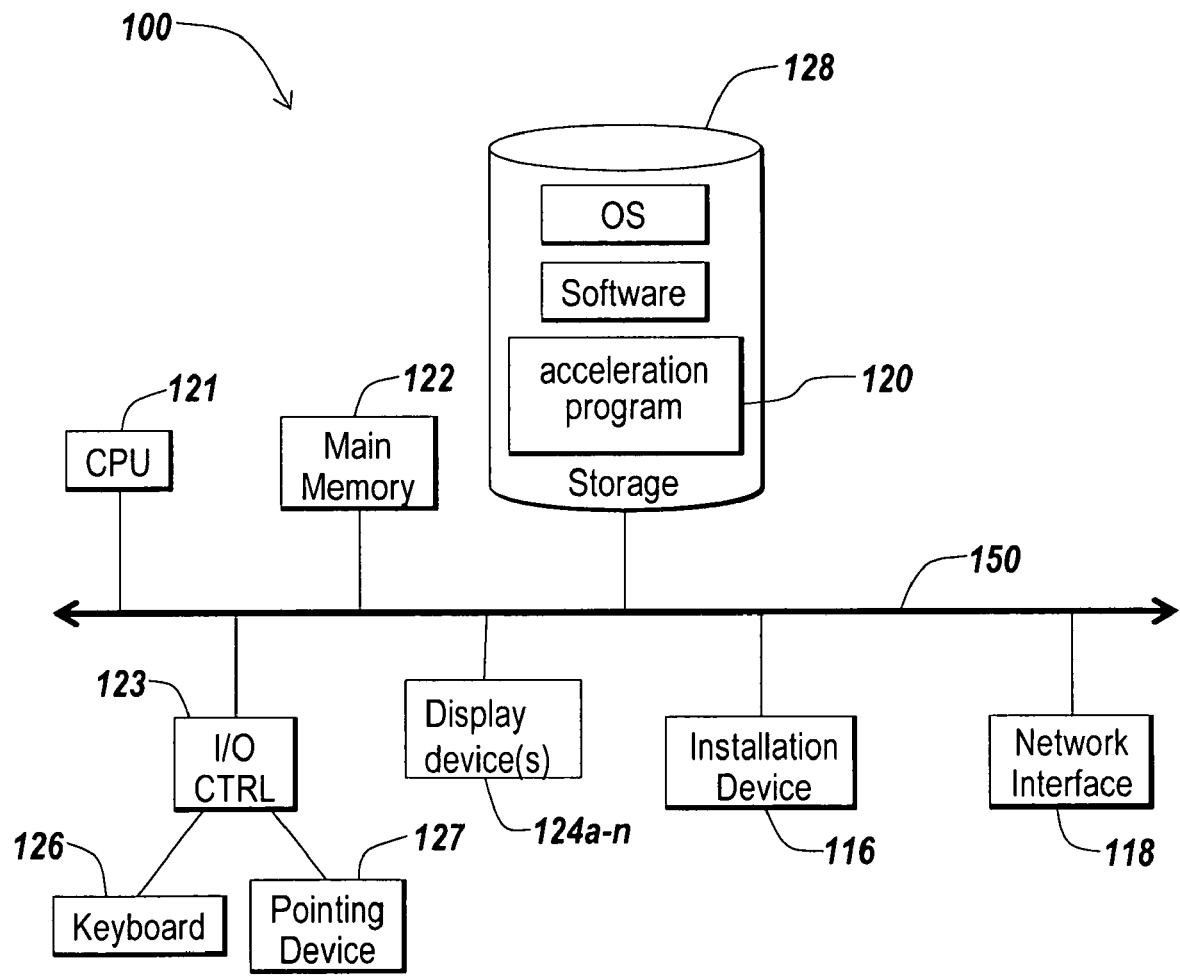
FIGS. 1A and 1B are block diagrams of embodiments of a computing or network device useful as a device in a client-server network.
Figure 1B:
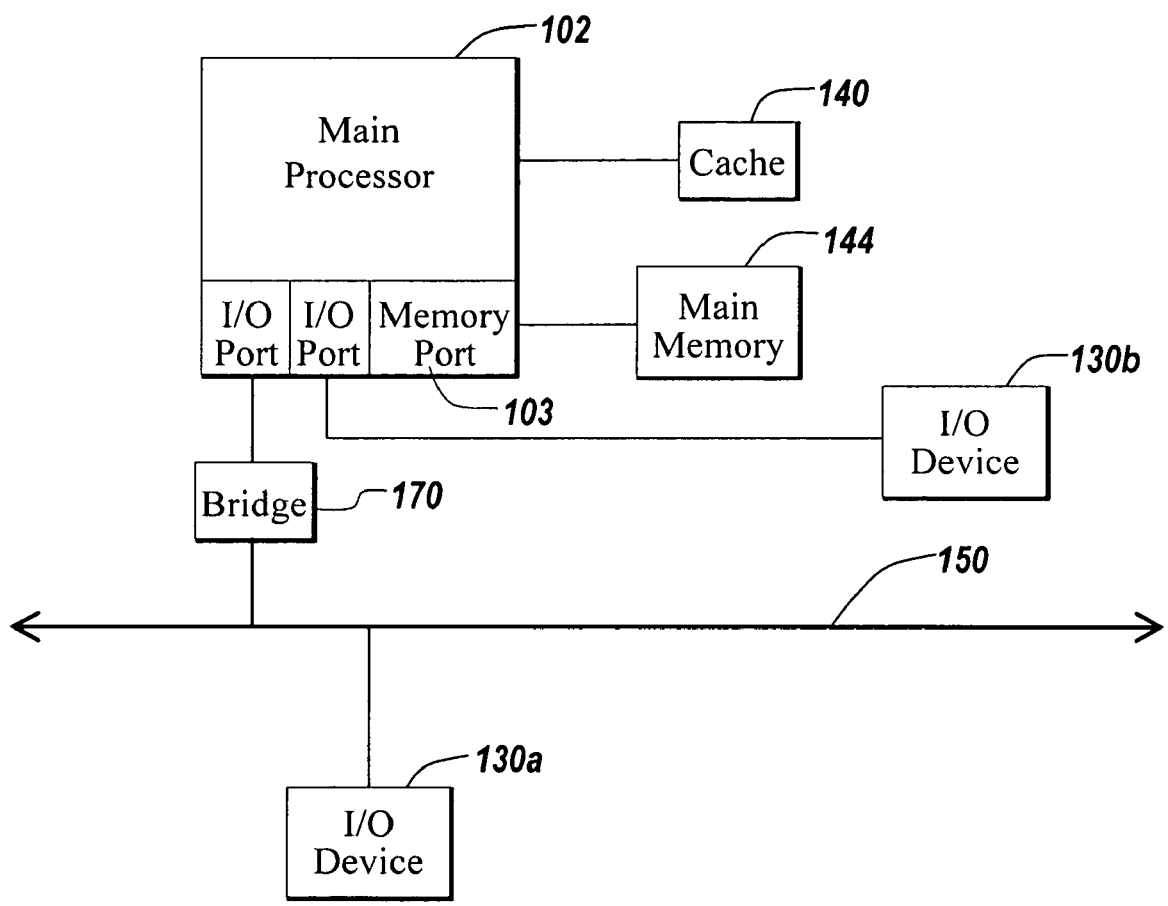

FIGS. 1A and 1B depict block diagrams of a typical computer 100 useful as client computing devices and server computing devices. As shown in FIGS. 1A and 1B, each computer 100 includes a central processing unit 102, and a main memory unit 104. Each computer 100 may also include other optional elements, such as one or more input/output devices 130a-130-b (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 1A, the processor 102 communicates with main memory 104 via a system bus 120 (described in more detail below). FIG. 1B depicts an embodiment of a computer system 100 in which the processor communicates directly with main memory 104 via a memory port. For example, in FIG. 1B the main memory 104 may be DRDRAM.

FIGS. 1A and 1B depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 104 and is typically provided by SRAM, BSRAM, or EDRAM.

In the embodiment shown in FIG. 1A, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 102 may use an Advanced Graphics Port (AGP) to communicate with the display. FIG. 1B depicts an embodiment of a computer system 100 in which the main processor 102 communicates directly with I/O device 130*b* via HyperTransport, Rapid I/O, or InfiniBand. FIG. 1B also depicts an embodiment in which local busses and direct communication are mixed: the processor 102 communicates with I/O device 130*a* using a local interconnect bus while communicating with I/O device 130*b* directly.

A wide variety of I/O devices 130 may be present in the computer system 100. Input devices include keyboards, mice, trackpads, trackballs, cameras, video cameras, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 120 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 1A and FIG. 1B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 1A and 1B, including the processor 102 and the main memory 104.

Figure 2:
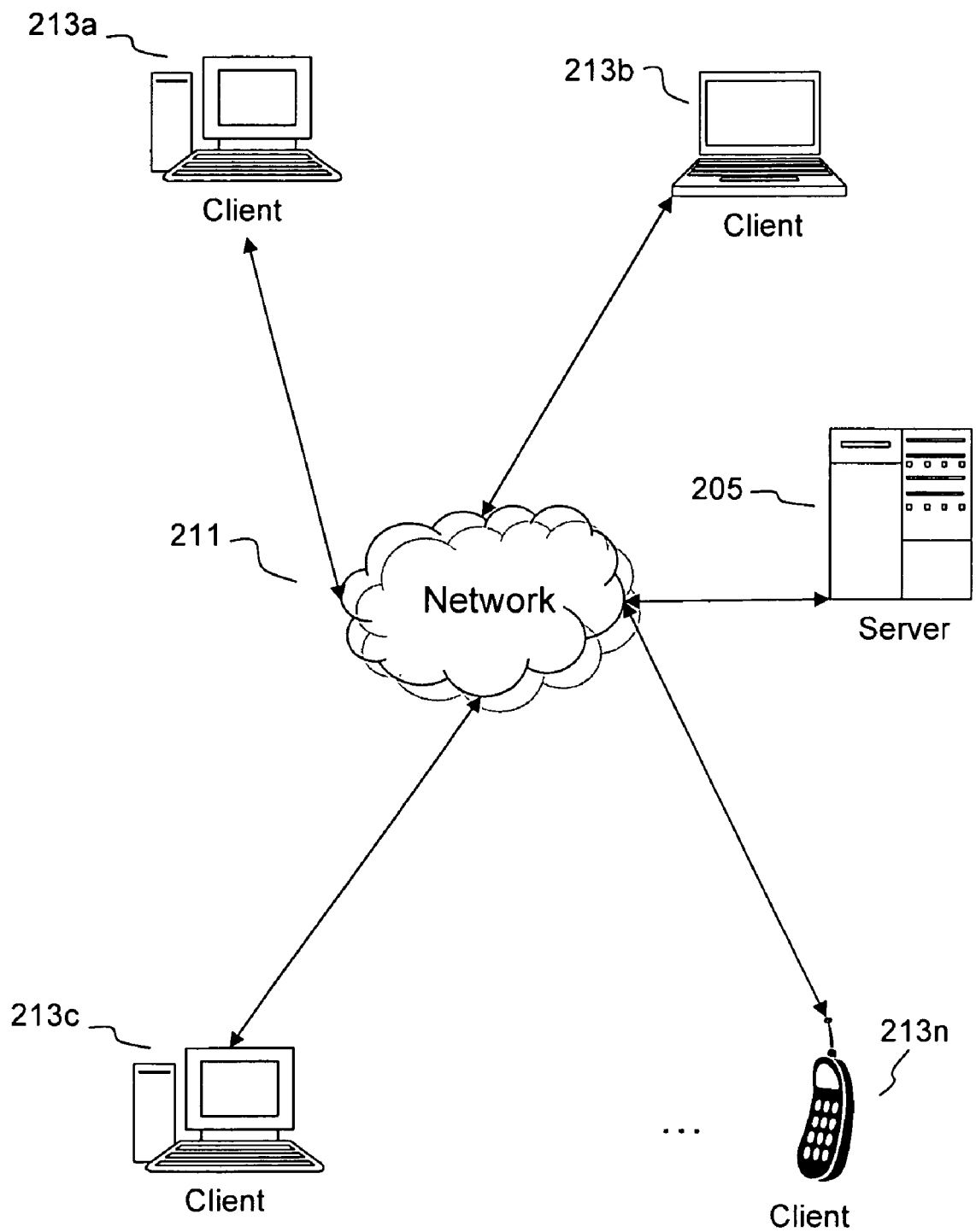
FIG. 2 is a block diagram depicting one embodiment of a computer network.

Referring now to FIG. 2 one embodiment of a computer network is depicted. In brief overview, a number of clients 213*a*, 213*b*, 213*c*, . . . , 213*n* (collectively referred to as 213), are connected via a network 211, to a each other and to a server 205. The clients 213, networks 211, and server 205 may comprise any computing devices comprising substantially similar capabilities, descriptions, functions, and configurations as described herein.

Still referring to FIG. 2, now in greater detail, in the embodiment shown, a number of clients 213 are connected to a network 211. The network 211 may comprise the Internet, local networks, web servers, file servers, routers, databases, computers, servers, network appliances, or any other computing devices capable of sending and receiving information. The network may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11 g and direct asynchronous connections, or any combination thereof. The network 211 may comprise mobile telephone networks utilizing any protocol or protocols used to communicate among mobile devices, including AMPS, TDMA, CDMA, GSM, GPRS or UMTS.

In some embodiments, the network configuration shown may be used to create a videoconference among a plurality of clients 213. In one embodiment, a videoconference may comprise a number of clients 213 transmitting a video stream to a number of other clients 213. In some embodiments, each participant may transmit an a video stream to a server 205, which then retransmits said streams to the other participants. In other embodiments, each participant may transmit a video stream to each other participant individually. In still other embodiments, a combination of centralized and decentralized transmissions may be used. For example, if two participants share a local network, the participants may transmit an audio and video stream directly to each other, and also transmit an audio and video stream to a server 205 for transmission to other non-local participants.

A videoconference transmitted over a network may comprise any known or proprietary videoconferencing protocol, including H.320, H.323, H.324, H.225.0, H.245, H.450, H.235, and H.239 as defined by the International Telecommunications Union, and including any standard or proprietary video compression algorithm, including MPEG-1, MPEG-2, MPEG-4, or H.264. In some embodiments, a client 213 may transmit multiple streams of data as part of a videoconference. For example, a client may transmit one stream of audio data, one stream of video data, one stream of presentation data, and one stream of control data. The audio, video, presentation, and control data may be encoded using any known encoding protocols. In other embodiments, a client may transmit a single stream of data.

Figure 3:
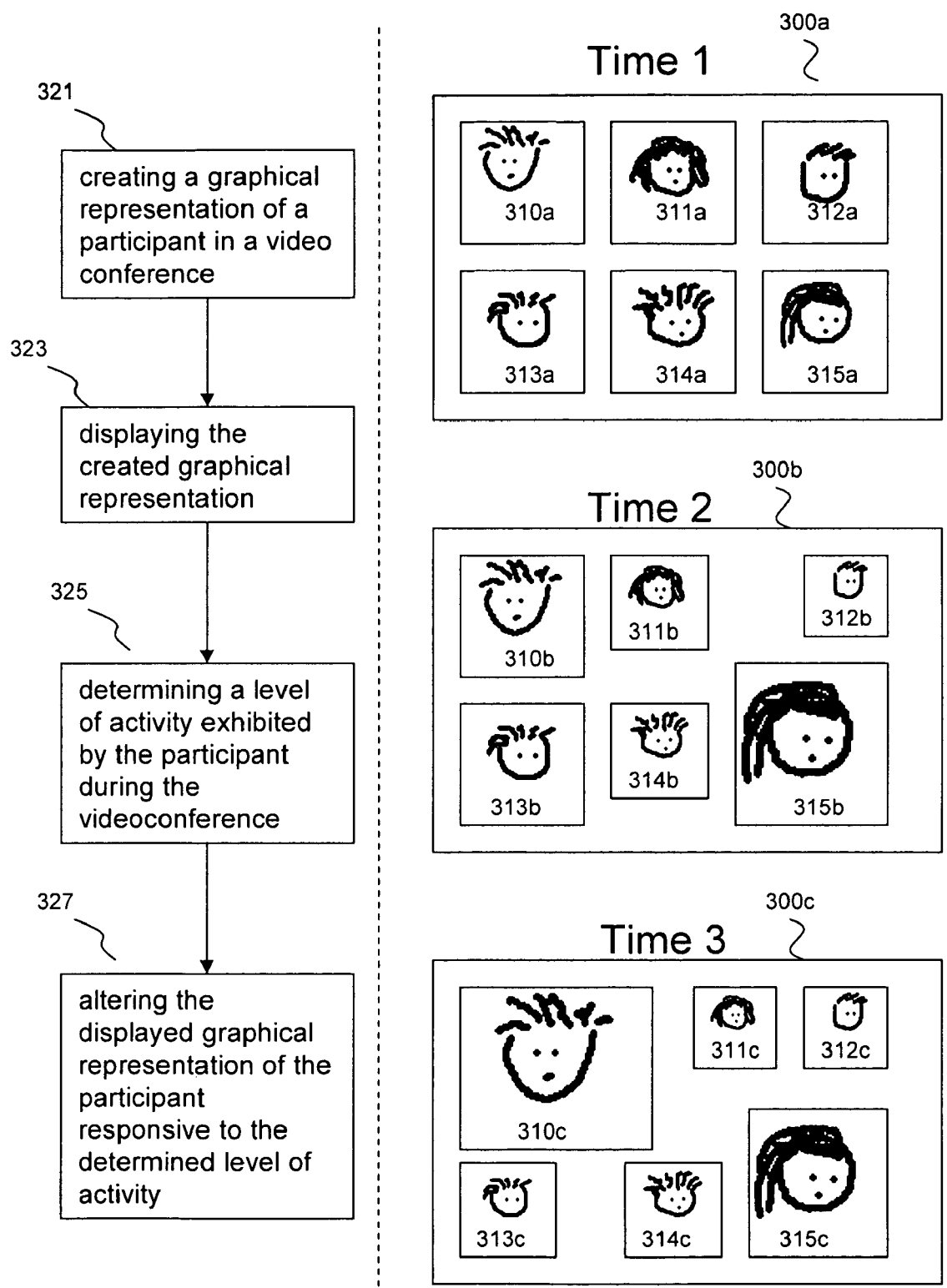
FIG. 3 is a block diagram depicting one embodiment of a method of generating a dynamic graphical representation of a participant in a videoconference that reflects the participant's level of activity during the videoconference.

Referring now to FIG. 3, one embodiment of a method for altering the displayed graphical representation of a participant responsive to the determined level of activity is shown. In brief overview, the method comprises: creating a graphical representation of a participant in a videoconference (step 321); displaying the created graphical representation (step 323); determining a level of activity exhibited by the participant during the videoconference (step 325); and altering the displayed graphical representation of the participant responsive to the determined level of activity (step 327). A videoconference display 300 is also depicted at three time intervals.

Still referring to FIG. 3, now in greater detail, the method shown first comprises creating a graphical representation of a participant in a videoconference (step 321). Said graphical representation may be created by any of the computing devices 100 described herein. In one embodiment, the graphical representation of a participant may comprise a graphical display of a video stream received from the participant. A received video stream received may comprise any video stream, and may comprise any known video stream protocol, including MPEG-1, MPEG-2, MPEG-4, H.261, H.263, and M-JPEG.

In some embodiments, the graphical representation of a participant may also comprise any display or formatting elements including text, images, borders, and avatars. For example, the video stream of a participant might be displayed along with text indicating the participants name or location. Or, for example, the video stream of a participant might be displayed with an avatar or icon representing the participant.

In some embodiments, creating a graphical representation of a participant may comprise transforming the graphical representation such that the graphical representation appears to have three dimensions. In one embodiment, a rectangular video stream may be stretched and skewed to give the appearance of facing a given direction. For example, the video streams of a number of participants may be transformed such that they appear to be arranged around a conference table.

After creating a graphical representation of a participant in a videoconference (step 321); the method shown comprises displaying the created graphical representation (step 323). The graphical representation may be displayed on any display device, including a monitor, CRT screen, LCD screen, television, PDA screen, video projector, and laptop screen.

In some embodiments, the displaying the created graphical representation may comprise displaying the created graphical representation on a screen also comprising graphical representations of other participants. In these embodiments, any known layout may be used, including N-up, box layouts, ring layouts, and three dimensional layouts. Videoconference screen 300*a* illustrates on example of an N-up layout with six participants.

In some embodiments, the graphical representations of a number of participants may initially be displayed as the same size. In other embodiments, graphical representations of participants may initially be displayed in different sizes. For example, the video stream of a videoconference organizer may be initially allocated a larger screen area.

In some embodiments, special screen locations may be assigned to designated participants. For example, the video stream of the videoconference organizer may initially be assigned to the top left position. Or, for example, the video streams of sub groups of participants may be grouped together.

In some embodiments, the graphical representations of participants may be displayed on a background. For example, the video stream of a participant might be displayed on a background of a conference table setting, such that the participant appeared to be sitting at the table.

In some embodiments, the participants displayed may all be remote participants. In other embodiments, a videoconference display screen may also comprise a display of the local participant. In some embodiments, the display of the local participant may be specially designated and displayed, according to any of the techniques for altering the graphical representation of a participant described herein.

After displaying the created graphical representation (step 323), the method shown comprises determining a level of activity exhibited by the participant during the videoconference (step 325).

In some embodiments, the activity level of a participant may be calculated according to the absolute audio volume of the participant. In other embodiments the activity level of a participant may be calculated relative to the audio volumes of all participants. In one embodiment, the activity level of a participant may be computed by dividing the volume output of a given participant by the total volume output from all participants. In other embodiments, other statistical measures, such as deviation from the mean volume of the group, or relative changes in volume from previous levels may be used to compute the activity level of a participant. For example, if a participant's average volume is high but unchanging, this may reflect background noise in the participant's environment rather than participation in the discussion. The activity level of the participant may then be reduced to accommodate this.

In some embodiments, said activity level computations may be adjusted to avoid sudden large changes in determined activity level. In one embodiment, the activity level for each participant to each participant is controlled to be within some threshold of its activity level to prevent the activity level from changing too abruptly. In some embodiments, a rolling average of a participant's volume may be used to compute activity level to similarly avoid abrupt changes.

In some embodiments, minimum and maximum values for activity level may be set. For example, a threshold could be set such that no person accounts for more than 50% of the total of all activity levels, and no person takes accounts for less than 4% of the total of all activity levels.

In some embodiments, metrics other than audio volume may be used to determine a participant's activity level. In one embodiment, the activity level of a participant may be computed according to the amount of motion in the participant's video stream. In another embodiment the activity level may be computed according to the amount of motion in the participant's video stream relative to the other participants. In yet another embodiment, the activity level may be computed according to the amount of motion in the participant's mouth area. In still another embodiment, the activity level may be computed according to the amount of motion in the participant's mouth area as compared to other participants. In some embodiments, an activity level may be calculated using both amount of motion and audio volume according to any of the methods described herein.

In some embodiments, an activity level may be calculated using information entered by a participant. For example, a participant momentarily leaving for a cup of coffee may indicate that they are going to be away, and their activity level may be reduced correspondingly. Or, for example, a participant who only intends to watch passively may indicate they are only observing, and their activity level may be reduced accordingly. Or for example, if a user mutes his or her microphone, their activity level may be reduced. In some embodiments, activity levels may be calculated using a combination of user-entered information and any of the other techniques described herein.

In other embodiments, activity level may be calculated by any other metric of estimating user participation, including determining the amount of talking or movement of a given participant.

In some embodiments, the activity levels may be computed in a centralized manner, such that every participant's display will reflect similar sizes for the participants. In one embodiment, the activity levels may be computed at a server 205 and transmitted to the videoconference participants. In other embodiments, a client 213 may serve as a master client and compute and transmit activity levels for all participants. In other embodiments, activity levels may be computed in a decentralized manner.

After determining a level of activity exhibited by the participant during the videoconference (step 325); the method shown comprises altering the displayed graphical representation of the participant responsive to the determined level of activity (step 327). In some embodiments, the displayed graphical representation of a participant may be altered a number of times. In this embodiment, the amount of time between alterations may comprise any time interval, including but not limited to microseconds, milliseconds, seconds, and minutes. In other embodiments, the displayed graphical representation of a participant may be altered continually or continuously over the course of a videoconference.

In some embodiments, altering the displayed graphical representation of a participant (step 327) may comprise altering the size of the displayed graphical representation. In some embodiments, the size of the graphical representation of participants exhibiting high activity levels may be increased. In other embodiments, the size of the graphical representation of participants exhibiting low activity levels may be decreased. In some embodiments, each participant may be allocated a percentage of the total screen area based on their percentage of the total activity level. For example, if a participant's activity level accounts for 40% of the total activity level (as measured by adding the activity levels of all participants), that participant may be allocated 40% of the videoconference display area. In some embodiments, a minimum or maximum value may be set for the screen area a given participant may occupy. In some embodiments, the proportion p of the screen corresponding to a given participant may be calculated by using the formula $p=a/\Sigma a$, where a is the activity level of the participant, and $\Sigma a$ is the sum of all the activity levels of all participants.

Still referring to FIG. 3 a videoconference display 300 in which the displayed graphical representations of the participants are altered over time is shown. A videoconference display 300*a* is shown at Time 1. The display 300*a* comprises six areas 310*a*, 311*a*, 312*a*, 313*a*, 314*a*, 315*a* comprising graphical representations of participants in a video conference. In the embodiment shown, each area displays a video stream transmitted by the participant. In the embodiment shown, the areas for the display of video streams are all the same size at the first time point. The time intervals between Times 1, 2 and 3 may be of any magnitude, including but not limited to microseconds, milliseconds, seconds, minutes.

In the embodiment shown, the displayed graphical representation of the participants has been altered during the time interval between Time 1 and Time 2. For example, the area 315 enlarges, while the areas 311, 312, and 314 are smaller. Said alterations in size may be responsive to activity levels calculated according to any of the methods described herein. In some embodiments, these changes may reflect that the participant corresponding to area 315 was speaking in the time interval prior to Time 2.

In the embodiment shown, the displayed graphical representation of the participants has been altered again during the time interval between Time 2 and Time 3. For example, the area 310 enlarges, while the area 313 becomes smaller. Said alterations in size may be responsive to activity levels calculated according to any of the methods described herein. In some embodiments, these changes may reflect that the participant corresponding to area 310 was speaking in the time interval prior to Time 3. In some embodiments, the area 315 maintaining its larger size may reflect that the participant corresponding to area 315 is still actively engaged in conversation.

In some embodiments, altering the displayed graphical representation of a participant (step 327) may comprise altering the relative position to other participants of the displayed graphical representation. In one embodiment, participants with high activity levels may be moved higher and closer to the center of a display relative to other participants. In another embodiment, participants with lower activity levels may be moved lower and closer to the edges of a display relative to other participants. For example, the participants may all be initially displayed in a row. Displays of participants may then be raised or lowered according to their activity level. In other embodiments, a designated position may be set aside for participants with activity levels above a given threshold. For example, the participant with the highest activity level may be displayed in the center of a ring, or in the top-left corner of a grid. In other embodiments, designated positions may be set aside for participants with activity levels below a given threshold. For example, participants with an activity level indicating they have not yet spoken may be displayed in a bottom row.

Figure 4:
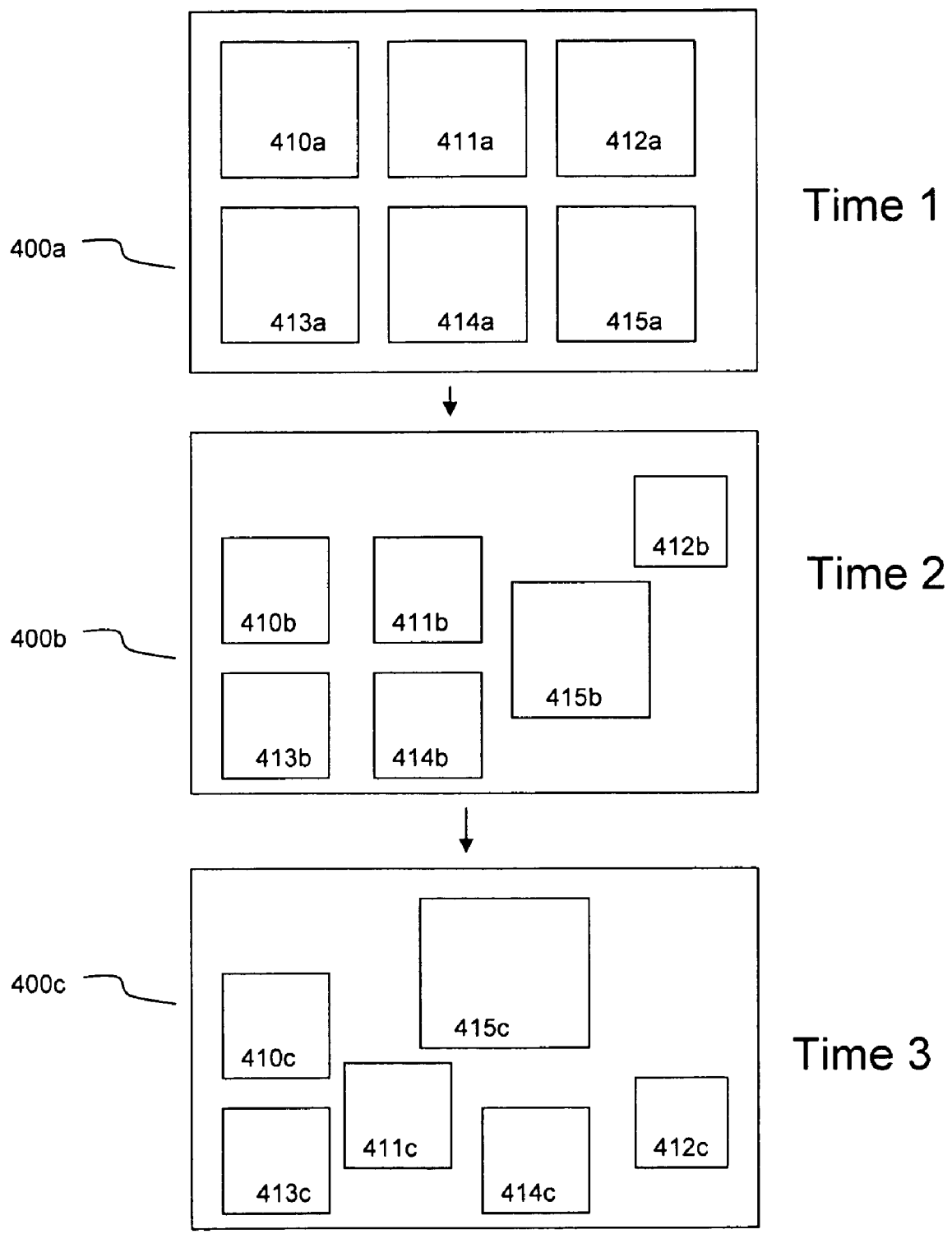
FIG. 4 is a block diagram depicting an embodiment of altering the displayed graphical representation of a videoconference participant responsive to the determined level of activity.

Referring now to FIG. 4, a block diagram depicting an embodiment of altering the displayed graphical representation of a videoconference participant responsive to the determined level of activity is shown. In brief overview, a videoconference display screen 400, is depicted at three time points, Times 1, 2 and 3. The videoconference display 400 comprises a number of areas 410, 411, 412, 413, 414, 415 in which video streams are displayed. The time intervals between Times 1, 2 and 3 may be of any magnitude, including but not limited to microseconds, milliseconds, seconds, minutes.

Still referring to FIG. 4, now in greater detail, a videoconference display 400a is shown at a first time point. The display 400a comprises six areas 410, 411, 412, 413, 414, 415 for displaying video streams. Each area corresponds to a participant in the videoconference, and may comprise any of the graphical representations described herein.

In the embodiment shown, several of the areas 410, 411, 412, 413, 414, 415 and their corresponding video streams change size and position during the time interval between Time 1 and Time 2. For example, the areas 410, 411, 413, and 414 shrink and move downward, while the area 415 enlarges and moves up and to the center of the display 400. Said changes in size and position may be responsive to activity levels calculated according to any of the methods described herein.

In the embodiment shown, several of the areas 410, 411, 412, 413, 414, 415 and their corresponding video streams again change size and position during the time interval between Time 2, and Time 3. For example, area 415 enlarges further and moves to the top-center of the display, while area 412 shrinks and moves to the bottom-right corner. Said changes in size and position may be responsive to an activity level calculated according to any of the methods described herein.

Figure 5:
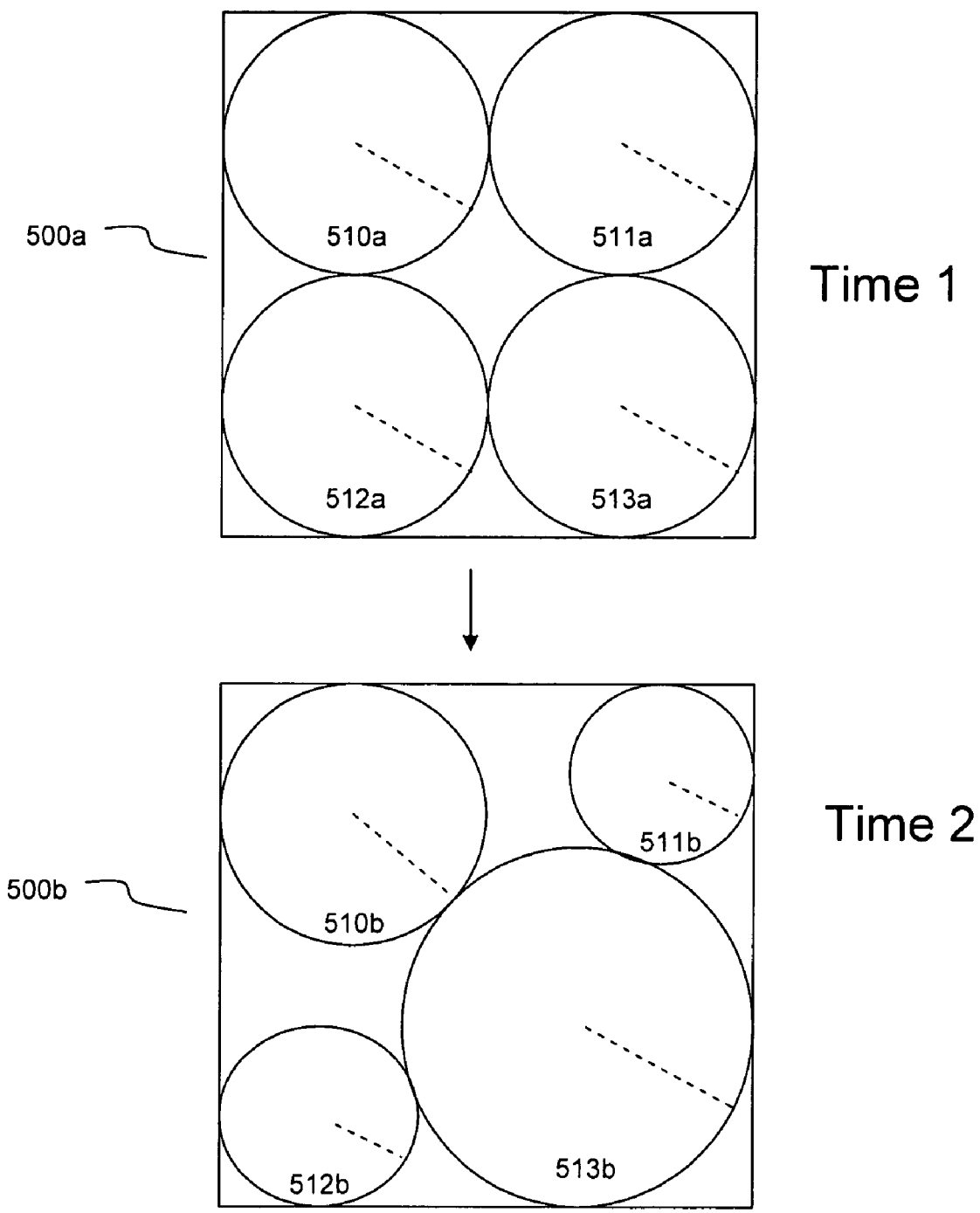
FIG. 5 is a block diagram depicting another embodiment of altering the displayed graphical representation of a videoconference participant responsive to the determined level of activity.

Now referring to FIG. 5, a block diagram depicting one embodiment of dynamically computing videoconference display areas is shown. In brief overview, a videoconference display 500 is depicted at 2 time points, Time 1 and Time 2. The display 500 is divided into a plurality of circles 510, 511, 512, 513, wherein each circle corresponds to a videoconference participant. The time intervals between Times 1 and 2 may be of any magnitude, including but not limited to milliseconds, seconds, minutes, and hours.

Still referring to FIG. 5, now in greater detail, each circle, such as 510 corresponds to a given videoconference participant. In the embodiment shown, at Time 1, all circles are the same size and have the same radius. In the embodiment shown, the video stream of each participant would be displayed inside the circle corresponding to that participant. In some embodiments, a participant's video stream may be displayed in an area comprising a rectangle inscribed in said participant's circle.

In the embodiment shown the size of each circle may be computed by treating the circle as an enclosed cylinder holding gas at a given pressure. The pressure may correspond to the activity level of the given participant, and may be calculated according to any of the methods described herein. Once the pressure is computed, the radius of the circle can be computed using known formulae based on physical principles. In one embodiment, the radius, r, of a circle may be computed using the formula $$r=\sqrt{(kp/\pi)}$$

where p is the pressure of the circle, and k is an initial constant. In some embodiments, the initial constant k may be set such that all circles are initially the same size and together occupy the entire display. In other embodiments, circles may be set with different initial constants to provide for different initial sizes. Other formulae may also be used to compute the subsequent position of the circles.

In the embodiment shown, the circles 510, 511, 512, 513 change size between Time 1 and Time 2. For example, the circle 511 becomes smaller, while the circle 513 grows larger. Said changes in pressure and corresponding size and position may be responsive to activity levels calculated according to any of the methods described herein.

In some embodiments, altering the displayed graphical representation of a participant (step 327) may comprise altering the transformation of the displayed graphical representation. In one embodiment, transformations of the displayed graphical representation may be altered such that the representations appear to be facing the participant with the highest activity level Now referring to FIG. 6, a block diagram depicting another embodiment of altering the displayed graphical representation of a videoconference participant responsive to the determined level of activity is shown. In brief overview, a videoconference display screen 600, is depicted at three time points, Times 1, 2 and 3. The videoconference display 600 comprises a number of areas 610, 611, 612, 613 in which video streams are displayed. The time intervals between Times 1, 2 and 3 may be of any magnitude, including but not limited to milliseconds, seconds, minutes, and hours.

Figure 6:
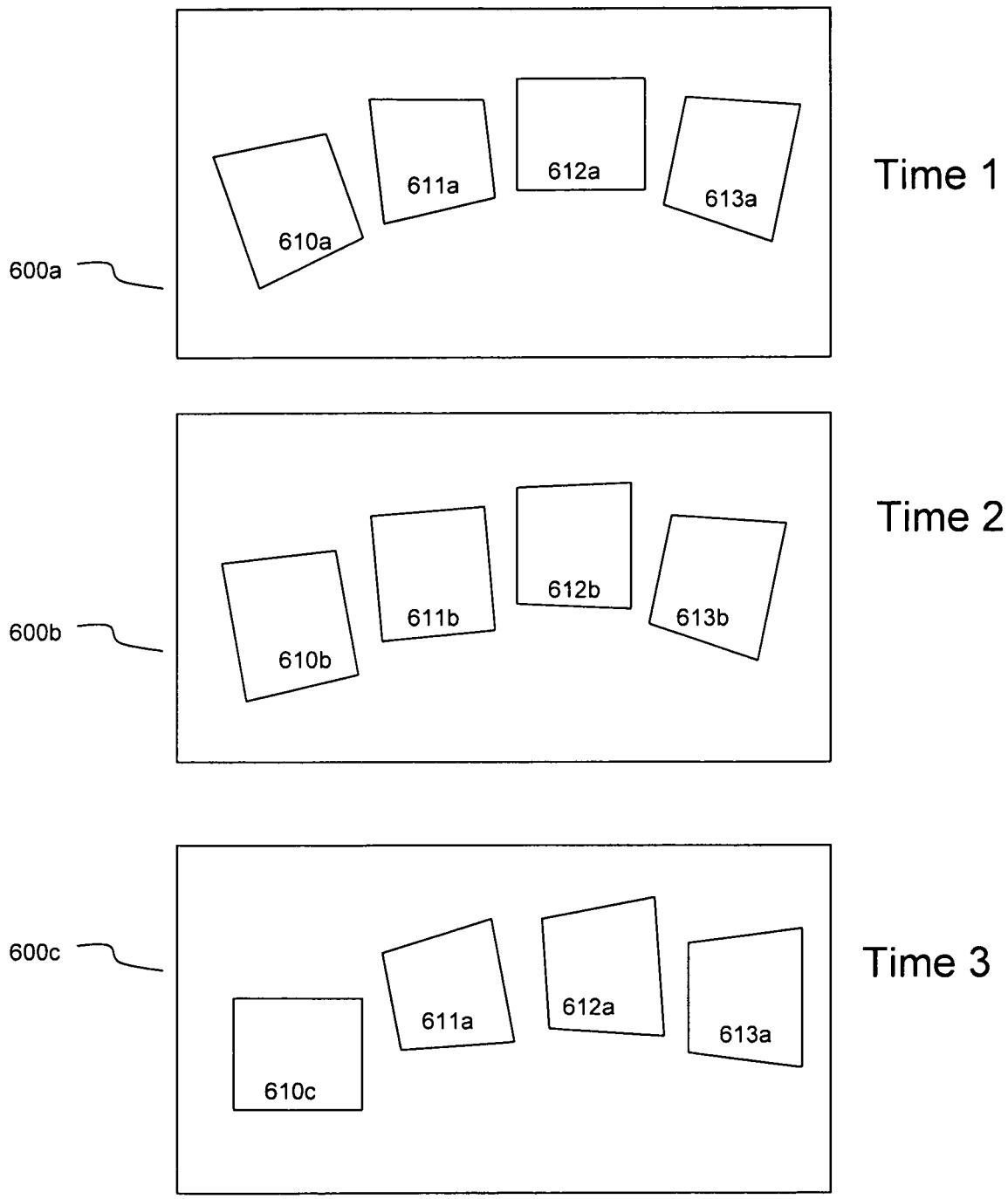
FIG. 6 is a block diagram depicting another embodiment of altering the displayed graphical representation of a videoconference participant responsive to the determined level of activity.

Still referring to FIG. 6, now in greater detail, a videoconference display 600a is shown at a first time point. The display 600a comprises four areas 610, 611, 612, 613 corresponding to participants in a videoconference. Each area may comprise any of the graphical representations of participants discussed herein. In the embodiment shown the rectangular areas are transformed such that they appear to be part of a three-dimensional scene.

At Time 1, in the embodiment shown, the areas 610, 611, 612, 613 are displayed in an arch centered around the area 612. In the embodiment shown, the area 612a is transformed so that it and its corresponding video stream appear flat. In the embodiment shown, the areas 610a, 611a, and 613a are transformed such that the areas appear to be facing area 612a. Said transformations may be performed according to any known image and video transformation algorithms, and may be implemented in accordance with any technique described herein.

At Time 2, in the embodiment shown the areas 610, 611, 612, 613 have changed transformation. For example, area 613 is transformed so that it appears at a greater angle, while area 610 is transformed so that it appears to be more directly facing outward. Said changes may be responsive to activity levels calculated according to any of the methods described herein. In some embodiments, said changes may be a result of more active participation by the participant corresponding to area 610.

At Time 3, in the embodiment shown, the areas 610, 611, 612, 613 have again changed their transformation. For example, area 610 is transformed so that it appears to be directly facing outward, while areas 611, 612, and 613 are transformed such that they appear to be facing area 610. Said changes may be responsive to activity levels calculated according to any of the methods described herein.

In some embodiments, altering the displayed graphical representation of a participant (step 327) may comprise altering the graphical representation of a participant in other ways. In one embodiment, participants below a given activity level threshold may be displayed in black and white, while persons above a given threshold are displayed in color. In another embodiment, participants below a given threshold may be displayed in grayscale. In some embodiments, the bit-depth of the colors used in the graphical representation of a participant may be altered. In other embodiments, a colored border may be used to indicate the participant with the highest activity level, or the participant most likely to be speaking. In other embodiments, any attributes of a participant's video stream may be altered, including but not limited to color, brightness, contrast, and sharpness. For example, the video stream of a relatively inactive participant may be dimmed and/or blurred, while the video stream of an active participant may be brightened and/or sharpened.

In some embodiments, altering the displayed graphical representation of a participant (step 327) may comprise displaying a still image in place of a video stream for a given participant. In some embodiments, participants below a given activity level threshold may be displayed as a static image. In some embodiments, said static image may represent the frame of the participant's video stream prior to their activity level falling below the threshold. In other embodiments, the static image may comprise a still photo or avatar designated by the participant.

In some embodiments, altering the displayed graphical representation of a participant (step 327) may comprise altering text within the graphical representation. In some embodiments, a participant with an activity level below a given threshold might be displayed with text such as "idle" or "inactive." In other embodiments, a participant with an activity level above a given threshold might be displayed with text such as "active" or "speaking."

In any of the embodiment described above for altering the displayed graphical representation of a participant, methods may be used so that the displayed graphical representation of a participant does not change too rapidly. For example, the altered relative position of a participant may be limited to a certain distance from the previous position. Or for example, the altered transformation of a participant may be limited to a certain angle from the previous transformation.

Figure 7:
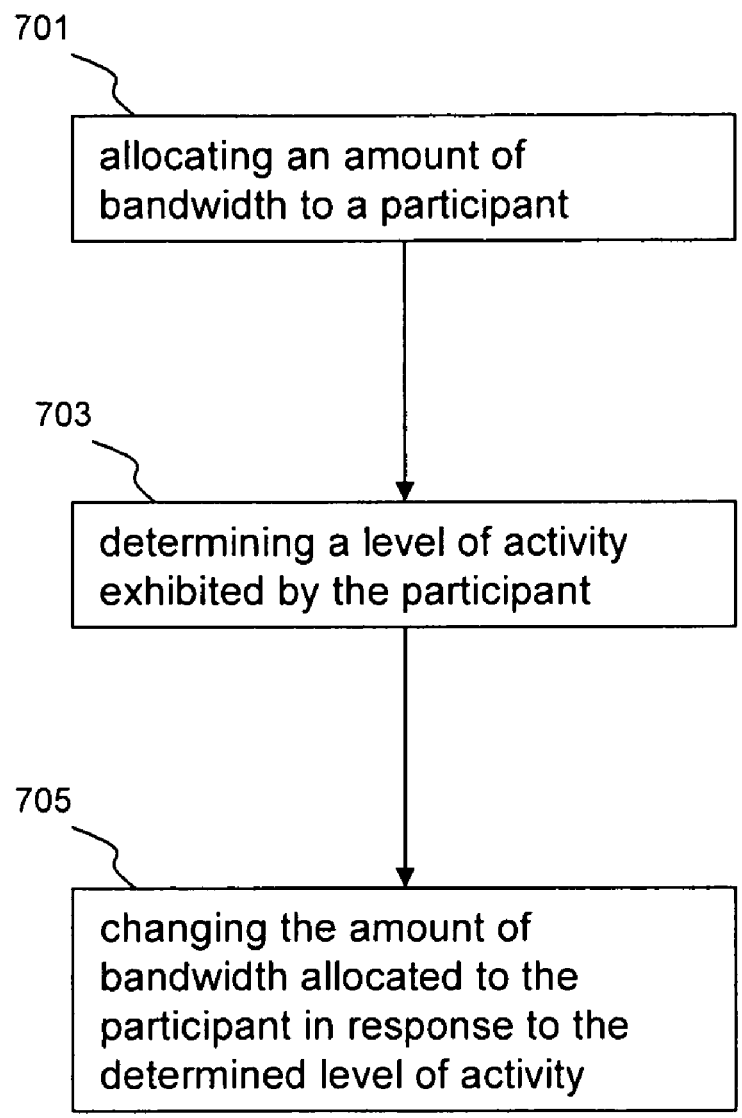
FIG. 7 is a block diagram depicting one embodiment of a method of allocating bandwidth to participants in a videoconference.

Referring now to FIG. 7, a method of allocating bandwidth to participants in a videoconference is shown. In brief overview, the method comprises: allocating an amount of bandwidth to a participant in a videoconference (step 701); determining a level of activity exhibited by the participant during the videoconference(step 703); and changing the amount of bandwidth allocated to the participant responsive to the determined level of activity(step 705).

Still referring to FIG. 7, now in greater detail, the method shown comprises allocating an amount of bandwidth to a participant in a videoconference (step 701). Said allocation may be done by any allocation method. In some embodiments, bandwidth may be initially allocated equally to all participants. In other embodiments, designated participants, such as the videoconference organizer, may be initially allocated greater bandwidth than other participants. In still other embodiments, bandwidth may be allocated based on local connection bandwidth. For example, if a total bandwidth for a videoconference is fixed, bandwidth may be allocated to individual participants based on the capabilities of the participants local connections.

After allocating an amount of bandwidth to a participant in a videoconference (step 701), the method comprises determining a level of activity exhibited by the participant during the videoconference(step 703). This level of activity may be determined using any of the methods described herein.

After determining a level of activity exhibited by the participant during the videoconference(step 703), the method comprises changing the amount of bandwidth allocated to the participant responsive to the determined level of activity(step 705). Any known means of changing video transmission bandwidth may be used. In some embodiments, the bandwidth may be changed by transmitting at a lower or higher resolution. In one embodiment, the resolution of the transmitted video may correspond to the current screen area allocated to the participant. In other embodiments, the bandwidth may be changed by transmitting at a lower or higher frame rate. In still other embodiments, the bandwidth may be changed by transmitting video with more or fewer colors. In still other embodiments, the bandwidth may be changed by transmitting video in black and white or grayscale. In yet other embodiments, the bandwidth may be changed by altering the quantization of prediction errors or the granularity of the subsampling. In one embodiment, changing the bandwidth may comprise switching to a different video codec.

In one embodiment, changing the amount of bandwidth allocated to the participant responsive to the determined level of activity(step 705) may comprise each participant may adjusting the bit rate of his or her own video stream such that the video stream consumes the same fraction of the globally available bandwidth as the ratio of the participant's screen estate to the total screen estate. The globally available bandwidth may either be static, assigned by a server 205 at run-time, or collaboratively estimated at run-time using well-known techniques. In another embodiment, a participant may change the bandwidth of his or her own video stream in response to the participants activity level as a percentage of the total activity level. In other embodiments, a user's local bandwidth may also be included in calculating the bit rate of a given video stream.

In one embodiment, if a participant's activity is below a given threshold, the participant's video-stream bit-rate may be reduced to zero. In this embodiment, a still image may be displayed in place of the participant's video stream.

In some embodiments, the techniques described herein may be employed in videoconferences wherein each participant transmits a local video stream to all other participants. In one embodiment, each participant may utilize any of the above methods in a decentralized manner. For example, a participant may receive a number of video streams from other participants, and compute the activity level and corresponding size of the displayed representation of each participant using any of the methods described above. Or, for example, a participant may receive a number of video streams from other participants, compute the activity level of each participant, compute the proportion the participant's own activity level to the total, and adjust the participant's own transmitted bandwidth accordingly using any of the methods described herein.

In other embodiments, the techniques described herein may be employed in videoconferences wherein any of the discussed methods are performed in a centralized manner. For example, a server 205, or elected master client 213 may compute activity levels for each participant and transmit said activity levels to all other participants. Or, for example, a server 205 may compute both activity levels and corresponding bandwidth allocations for each participant, and transmit information corresponding to said bandwidth allocations to all participants. In some embodiments, the server 205 may then alter the bandwidths that the server 205 retransmits the video streams of said participants.

In some embodiments, an interface may provide for manual override of any of the functions described herein. In some embodiments, a given participant may enlarge the display of a given participant if the user so wishes. For example, in some embodiments, functionality may be provided so that a participant may request that the user's video stream is displayed at a given size.

While the invention has been particularly shown and described with reference to specific preferred embodiments, it should be understood by those skilled in the art that various changes in form and detail may be made therein departing from the spirit and scope of the invention as defined by the appended claims.

I claim:

1. A method of generating a dynamic graphical representation of a participant in a videoconference that reflects the participant's level of activity during the videoconference, the method comprising:
   (a) creating a graphical representation of a participant in a videoconference;
   (b) causing the display of the created graphical representation on a screen;
   (c) determining a level of activity exhibited by the participant during the videoconference;
   (d) determining a percentage of a total activity level represented by the determined level of activity by comparing the determined level of activity to a sum of all activity levels of all participants in the videoconference; and
   (e) causing the displayed graphical representation of the participant to be altered to occupy a percentage of the total screen area equal to the percentage determined in step (d).

2. The method of claim 1 wherein step (a) comprises creating a two-dimensional graphical representation of a participant in a videoconference.

3. The method of claim 1 wherein step (a) comprises creating a three-dimensional graphical representation of a participant in a videoconference.

4. The method of claim 1 wherein step (a) comprises creating a two-dimensional graphical representation of a participant in a videoconference using an image of the participant.

5. The method of claim 1 wherein step (a) comprises creating a two-dimensional video representation of a participant in a videoconference.

6. The method of claim 1 wherein step (c) comprises determining the participant's absolute volume level during the videoconference.

7. The method of claim 1 wherein step (c) comprises determining the participant's volume level during the videoconference relative to other participants.

8. The method of claim 1 wherein step (c) comprises determining the participant's volubility during the videoconference.

9. The method of claim 1 wherein step (c) comprises determining the participant's level of animation during the videoconference.

10. The method of claim 1 wherein step (c) comprises determining the participant's level of animation during the videoconference relative to other participants.

11. The method of claim 1 further comprising changing the relative position of the displayed graphical representation of the participant responsive to the determined level of activity.

12. The method of claim 1 further comprising changing the color bit depth of the displayed graphical representation of the participant responsive to the determined level of activity.

13. The method of claim 1 further comprising replacing a color graphical representation of the participant with a grayscale representation of the participant responsive to the determined level of activity.

14. The method of claim 1 further comprising replacing a color graphical representation of the participant with a black and white representation of the participant responsive to the determined level of activity.

15. The method of claim 1 further comprising replacing a video representation of the participant with a still image responsive to the determined level of activity.

16. The method of claim 1 further comprising changing a transformation of the displayed graphical representation of the participant responsive to the determined level of activity.

17. The method of claim 1 wherein step (c) comprises determining a deviation in the participant's volume level from a mean volume level of all participants in the videoconference.

18. The method of claim 1 wherein step (c) comprises determining an amount of motion in the participant's mouth area during the videoconference.

19. An apparatus for generating a dynamic graphical representation of a participant in a videoconference that reflects the activity level of the participant during the videoconference, the apparatus comprising:
   an activity monitor for (i) determining a level of activity exhibited by a first participant during a videoconference and (ii) determining a percentage of a total activity level represented by the determined level of activity by comparing the determined level of activity to a sum of all activity levels of all participants in the videoconference; and
   a display engine, in communication with the activity monitor, for (i) causing the display of a graphical representation of the first participant on a screen and (ii) causing the displayed graphical representation of the first participant to be altered to occupy a percentage of the total screen area equal to the percentage determined by the activity monitor.

20. The apparatus of claim 19 wherein the display engine creates a two-dimensional graphical representation of the first participant.

21. The apparatus of claim 19 wherein the display engine creates a three-dimensional graphical representation of the first participant.

22. The apparatus of claim 19 wherein the display engine creates a two-dimensional graphical representation of the first participant using an image of the first participant.

23. The apparatus of claim 19 wherein the display engine creates a two-dimensional video representation of the first participant.

24. The apparatus of claim 19 wherein the activity monitor determines the first participant's absolute volume level during the videoconference.

25. The apparatus of claim 19 wherein the activity monitor determines the first participant's volume level during the videoconference relative to other participants.

26. The apparatus of claim 19 wherein the activity monitor determines the first participant's volubility during the videoconference.

27. The apparatus of claim 19 wherein the activity monitor determines the first participant's level of animation during the videoconference.

28. The apparatus of claim 19 wherein the activity monitor determines the first participant's level of animation during the videoconference relative to other participants.

29. The apparatus of claim 19 wherein the display engine changes the relative position of the displayed graphical representation of the first participant responsive to the determined level of activity.

30. The apparatus of claim 19 wherein the display engine changes the color bit depth of the displayed graphical representation of the first participant responsive to the determined level of activity.

31. The apparatus of claim 19 wherein the display engine replaces a color graphical representation of the first participant with a grayscale representation of the first participant responsive to the determined level of activity.

32. The apparatus of claim 19 wherein the display engine replaces a color graphical representation of the first participant with a black and white representation of the first participant responsive to the determined level of activity.

33. The apparatus of claim 19 wherein the display engine replaces a video representation of the first participant with a still image responsive to the determined level of activity.

34. The apparatus of claim 19 wherein the display engine changes a transformation of the displayed graphical representation of the first participant responsive to the determined level of activity.

35. A method of allocating bandwidth to participants in a videoconference, the method comprising:
   (a) allocating an amount of bandwidth to a participant in a videoconference;
   (b) determining a level of activity exhibited by the participant during the videoconference;
   (c) determining a percentage of a total activity level represented by the determined level of activity by comparing the determined level of activity to a sum of all activity levels of all participants in the videoconference; and
   (d) changing a percentage of the total available bandwidth allocated to the participant to be equal to the percentage determined in step (c).

36. The method of claim 35 wherein step (b) comprises determining the participant's absolute volume level during the videoconference.

37. The method of claim 35 wherein step (b) comprises determining the participant's volume level during the videoconference relative to other participants.

38. The method of claim 35 wherein step (b) comprises determining the participant's volubility during the videoconference.

39. The method of claim 35 wherein step (b) comprises determining the participant's level of animation during the videoconference.

40. The method of claim 35 wherein step (b) comprises determining the participant's level of animation during the videoconference relative to other participants.

41. The method of claim 35 wherein step (b) comprises
   (b-a) receiving a communication from another participant in the video conference, the communication including an indication of the activity level exhibited by the another participant; and
   (b-b) comparing an indication of the participant's level of activity to the another participant's level of activity.

42. The method of claim 35 wherein step (d) comprises increasing the amount of bandwidth allocated to the participant.

43. The method of claim 35 wherein step (d) comprises decreasing the amount of bandwidth allocated to the participant.

44. The method of claim 35 further comprising changing a size of a transmitted graphical representation of the participant responsive to the change in bandwidth allocated to the participant.

45. The method of claim 35 further comprising changing the a color bit depth of the a transmitted graphical representation of the participant responsive to the change in bandwidth allocated to the participant.

46. The method of claim 35 further comprising replacing a color graphical representation of the participant with a grayscale representation of the participant responsive to the change in bandwidth allocated to the participant.

47. The method of claim 35 further comprising replacing a color graphical representation of the participant with a black and white representation of the participant responsive to the change in bandwidth allocated to the participant.

48. The method of claim 35 further comprising replacing a video representation of the participant with a still image responsive to the change in bandwidth allocated to the participant.

49. The method of claim 35 wherein step (b) comprises determining a deviation in the participant's volume level from a mean volume level of all participants in the videoconference.

50. The method of claim 35 wherein step (b) comprises determining an amount of motion in the participant's mouth area during the videoconference.

51. An apparatus for allocating bandwidth to participants in a videoconference, the apparatus comprising:
   an activity monitor for (i) determining a level of activity exhibited by a local participant during a videoconference and (ii) determining a percentage of a total activity level represented by the determined level of activity by comparing the determined level of activity to a sum of all activity levels of all participants in the videoconference; and
   a network engine, in communication with the activity monitor, for (i) transmitting data to a remote participant in the videoconference and (ii) changing a percentage of the total available bandwidth consumed in transmitting the data to be equal to the percentage determined by the activity monitor.

52. The apparatus of claim 51 wherein the activity monitor determines the local participant's absolute volume level during the videoconference.

53. The apparatus of claim 51 wherein the activity monitor determines the local participant's volume level during the videoconference relative to other participants.

54. The apparatus of claim 51 wherein the activity monitor determines the local participant's volubility during the videoconference.

55. The apparatus of claim 51 wherein the activity monitor determines the local participant's level of animation during the videoconference.

56. The apparatus of claim 51 wherein the activity monitor determines the local participant's level of animation during the videoconference relative to other participants.

57. The apparatus of claim 51 further comprising a display engine in communication with the network engine, the display engine for changing a size of a transmitted graphical representation of the local participant responsive to the amount of bandwidth allocated to the local participant.

58. The apparatus of claim 51 further comprising a display engine in communication with the network engine, the display engine for changing a color bit depth of a transmitted graphical representation of the local participant responsive to the amount of bandwidth allocated to the local participant.

59. The apparatus of claim 51 further comprising a display engine in communication with the network engine, the display engine for replacing a color graphical representation of the local participant with a grayscale representation of the local participant responsive to the amount of bandwidth allocated to the local participant.

60. The apparatus of claim 51 further comprising a display engine in communication with the network engine, the display engine for replacing a color graphical representation of the local participant with a black and white representation of the local participant responsive to the amount of bandwidth allocated to the local participant.

61. The apparatus of claim 51 further comprising a display engine in communication with the network engine, the display engine for replacing a video representation of the local participant with a still image responsive to the amount of bandwidth allocated to the local participant.

* * * * *